United States Patent
Yabuzaki

(10) Patent No.: US 11,835,123 B2
(45) Date of Patent: Dec. 5, 2023

(54) OIL STRAINER

(71) Applicants: JATCO Ltd, Fuji (JP); NISSAN MOTOR CO., LTD., Yokohama (JP)

(72) Inventor: Isao Yabuzaki, Atsugi (JP)

(73) Assignees: JATCO LTD, Fuji (JP); NISSAN MOTOR CO., LTD., Yokohama (JP)

(*) Notice: Subject to any disclaimer, the term of this patent is extended or adjusted under 35 U.S.C. 154(b) by 535 days.

(21) Appl. No.: 17/262,072

(22) PCT Filed: Jul. 19, 2019

(86) PCT No.: PCT/JP2019/028401
§ 371 (c)(1),
(2) Date: Jan. 21, 2021

(87) PCT Pub. No.: WO2020/022200
PCT Pub. Date: Jan. 30, 2020

(65) Prior Publication Data
US 2021/0301915 A1    Sep. 30, 2021

(30) Foreign Application Priority Data

Jul. 27, 2018  (JP) ................................ 2018-140839

(51) Int. Cl.
*F16H 57/04* (2010.01)

(52) U.S. Cl.
CPC ..... *F16H 57/0404* (2013.01); *F16H 57/0452* (2013.01)

(58) Field of Classification Search
CPC ............. F16H 57/0404; F16H 57/0452; F16H 57/0489
See application file for complete search history.

(56) References Cited

U.S. PATENT DOCUMENTS

| | | |
|---|---|---|
| 2005/0133421 A1 | 6/2005 | Peet |
| 2005/0133428 A1 | 6/2005 | Peet |
| 2007/0023337 A1 | 2/2007 | Peet |

FOREIGN PATENT DOCUMENTS

| | | |
|---|---|---|
| JP | H02-112310 U | 9/1990 |
| JP | H03-026312 U | 3/1991 |
| JP | 2005-248945 A | 9/2005 |
| JP | 2008-261452 A | 10/2008 |

*Primary Examiner* — Dirk R Bass
(74) *Attorney, Agent, or Firm* — Foley & Lardner LLP

(57) ABSTRACT

An oil strainer is arranged between an oil pan configured to close a lower opening of a transmission case and a control valve body which is installed in the lower opening. The control valve body has a discharge hole of oil in a portion opposing the oil strainer. The oil strainer has an oil suction port in a portion opposing the oil pan, and has a rib projecting on the control valve body side on a surface of a portion opposing the control valve body. When seen from the oil pan side, the oil suction port and the discharge hole are provided so that positions are not matched from each other. When seen from the oil pan side, the rib is provided to cross a straight line passing through the oil suction port and the discharge hole in a region between the oil suction port and the discharge hole.

6 Claims, 5 Drawing Sheets

OIL STRAINER

TECHNICAL FIELD

The present invention relates to an oil strainer.

BACKGROUND ART

Patent Literature 1 discloses an oil strainer having plural ribs configured to support a filtering member (filter). The plural ribs are provided inside the oil strainer and integrated with a body of the oil strainer.

In general, an oil strainer of an automatic transmission for a vehicle is attached to a control valve body fixed to a lower portion of a transmission case.

Oil to be used for actuation and lubrication of a transmission mechanism is stored in an oil pan configured to close a lower opening of the transmission case. The oil strainer is provided so that a suction port of the oil is positioned in the oil OL stored in the oil pan.

In the automatic transmission, when an oil pump is driven, the oil in the oil pan is suctioned to the oil pump via the oil strainer. The oil pump pressurizes the suctioned oil and supplies to a hydraulic control circuit in the control valve body.

Oil pressure supplied to the hydraulic control circuit is used for the actuation and the lubrication of the transmission mechanism, and then stored in the oil pan again.

The oil used for the actuation and the lubrication of the transmission mechanism contains foreign substances such as metal powder. Therefore, a filter (SUS mesh filter) configured to remove foreign substances contained in the oil is provided in the oil strainer.

In recent years, in order to catch more foreign substances contained in the oil, an oil strainer provided with an unwoven cloth in addition to the existing SUS mesh filter is proposed.

In the oil strainer provided with the unwoven cloth, the unwoven cloth serves as resistance against passage of the oil. Therefore, by increasing size of the oil strainer more than a conventional oil strainer and extending an area of the unwoven cloth, the total amount of the oil passing through the unwoven cloth to be suctioned to the oil pump side is increased.

In this case, an area of the oil strainer seen from the oil pan side is extended. As a result, a lower surface of the control valve body on the oil pan side is covered by the oil strainer over a wide range.

A discharge hole of the oil drained from a pressure adjusting valve is opened on the lower surface of the control valve body on the oil pan side.

Therefore, when the size of the oil strainer is increased and the oil strainer is arranged to cover the discharge hole of the oil when seen from the oil pan side, the oil discharged from the discharge hole bypasses an outer peripheral edge of the oil strainer and returns to the oil pan.

In a case where viscosity of the oil is high, return of the oil to the oil pan is slowed.

In such a case, an oil surface of the oil in the oil pan becomes lower than the suction port of the oil of the oil strainer, and suction of the air may occur.

In a case where the oil strainer is arranged to cover the oil discharge hole of the oil of the control valve body when seen from the oil pan side, there is a need for bringing more oil back to the suction port opened on the oil pan side.

PRIOR ART DOCUMENTS

Patent Document

Patent Document 1: JPH03-26312U

SUMMARY OF INVENTION

The present invention is an oil strainer arranged between an oil pan configured to close a lower opening of a transmission case and a control valve body which is installed in the lower opening, wherein the control valve body has a discharge hole of oil in a portion opposing the oil strainer, the oil strainer has an oil suction port in a portion opposing the oil pan, and has a rib projecting on the control valve body side on an outer surface of a portion opposing the control valve body, when seen from the oil pan side, the oil suction port and the discharge hole are provided so that positions are not matched from each other, and when seen from the oil pan side, the rib is provided to cross a straight line passing through the oil suction port and the discharge port in a region between the oil suction port and the discharge port.

According to the present invention, a moving distance (journey) by which the oil discharged from the discharge hole reaches the oil suction port is extended.

The oil flowing toward the oil suction port pulls oil in a nearby region. Thus, the oil nearby is taken into a flow of the oil running toward the oil suction port.

Therefore, by an amount of extension of the moving distance (journey), an amount of the oil to be taken in is increased. Thus, it is possible to supply more oil to the oil suction port.

In a case of an oil strainer provided with no rib, a flow of the oil becomes the shortest distance connecting the discharge hole and the oil suction port. In this case, a region where no flow of the oil running toward the oil suction port is created is provided in the oil pan.

By configuring as above and extending the journey, it is possible to create a flow of the oil even in a region where no flow of the oil is created.

Thereby, since the journey is extended, the oil in the region where no flow of the oil is created is involved. Thus, the amount of the oil to be taken in is increased.

DESCRIPTION OF EMBODIMENTS

Hereinafter, an embodiment of the invention will be described with a case of a belt continuously variable transmission 1 for a vehicle as an example.

Figure 1:
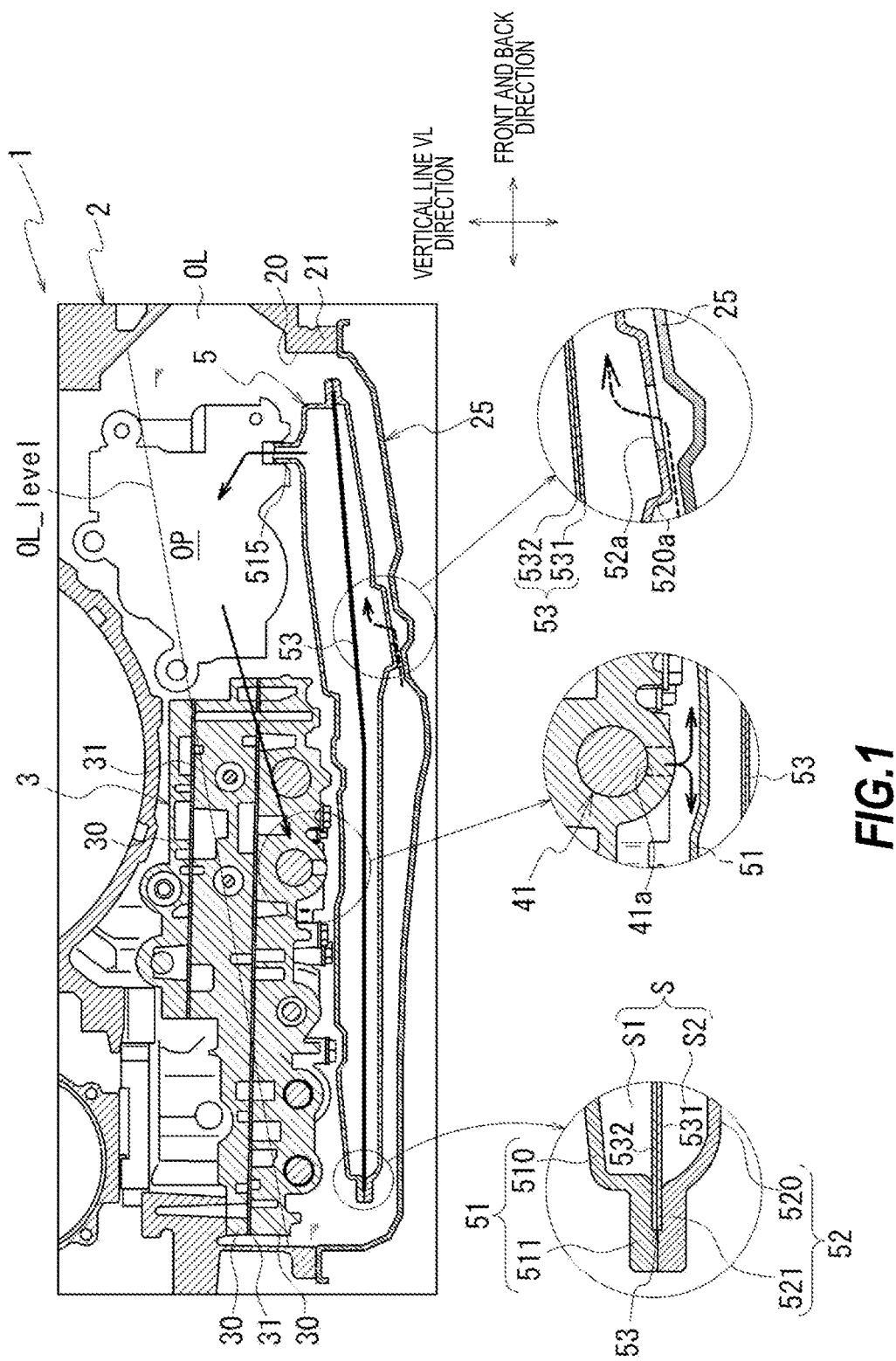
FIG. 1 is a view for explaining a configuration around an oil pan of a belt continuously variable transmission.

FIG. 1 is a view for explaining a configuration around an oil pan 25 of the belt continuously variable transmission 1.

In FIG. 1, the vertical line VL direction with an installed state of the continuously variable transmission 1 in the vehicle as a reference is shown by an arrow. In the following description, the "upper side" and the "lower side" with respect to the vertical line VL direction will be used to describe a positional relationship between constituent elements according to need.

In FIG. 1, height of oil OL stored in the oil pan 25 is shown by a fine line attached with the reference sign "OL_level."

The continuously variable transmission 1 has a transmission case 2 configured to accommodate a transmission mechanism (variator) (see FIG. 1).

In a lower portion of the transmission case 2, an opening 20 (lower opening) configured to return the oil OL used for actuation and lubrication of the transmission mechanism to the oil pan 25 side is provided. The oil pan 25 is fixed to a lower surface of a peripheral edge portion 21 enclosing the opening 20 by a bolt. The opening 20 of the lower portion of the transmission case 2 is closed by the oil pan 25.

In a region inside the peripheral edge portion 21 (region in the opening 20), a control valve body 3 and an oil pump OP fixed to the transmission case 2 are provided.

The oil pump OP suctions and pressurizes the oil OL stored in the oil pan 25 and supplies to a hydraulic control circuit 4 (see FIG. 2) in the control valve body 3.

The control valve body 3 has a basic configuration in which a separate plate 31 is sandwiched between valve bodies 30, 30, and the hydraulic control circuit 4 is formed inside.

The hydraulic control circuit 4 is provided with solenoids to be driven on the basis of a command from a control device (not shown) and pressure adjusting valves to be actuated by signal pressure, etc. generated by the solenoids.

The hydraulic control circuit 4 adjusts working oil pressure of the transmission mechanism (such as a variator) from oil pressure generated in the oil pump OP.

Figure 2:
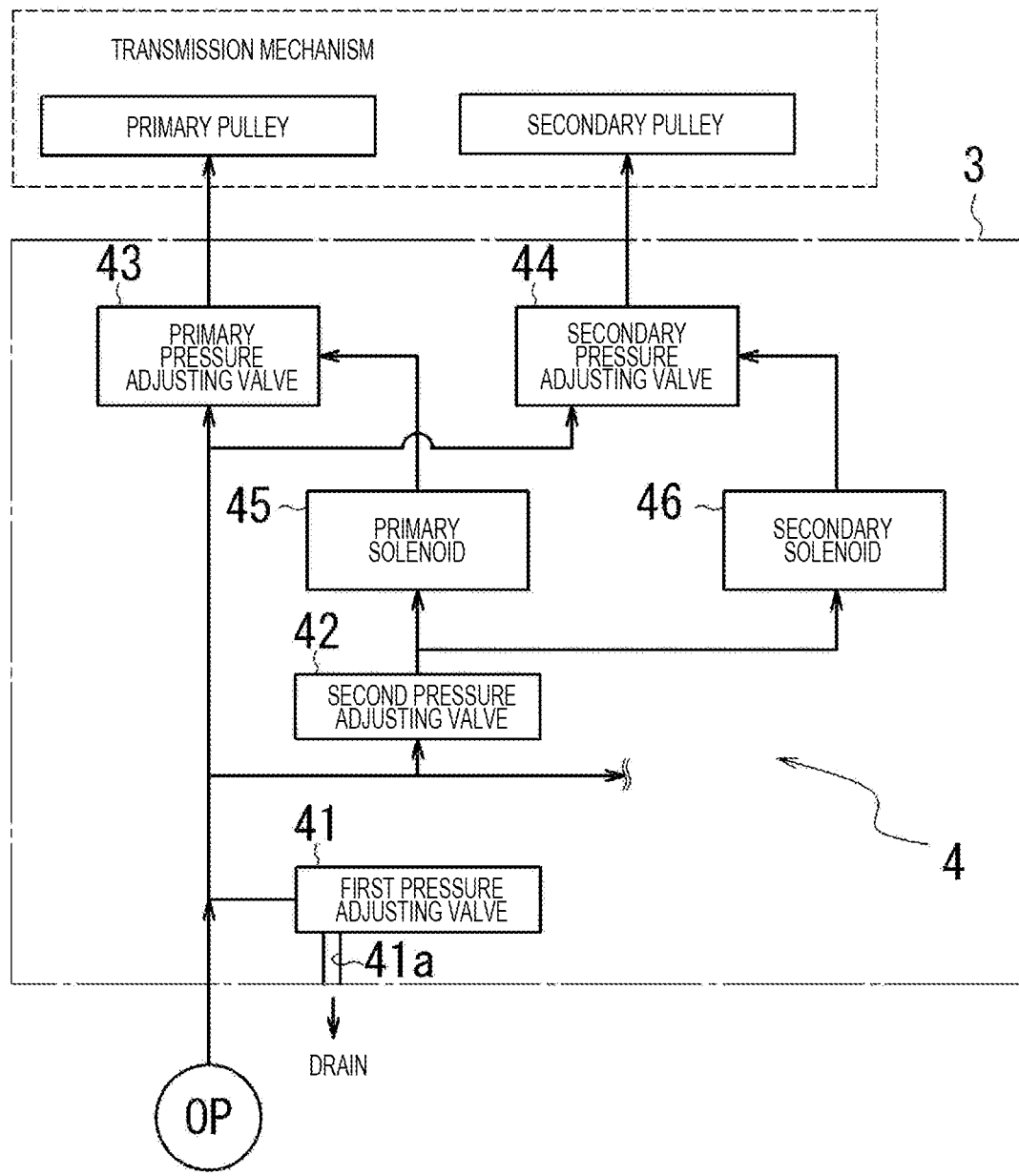
FIG. 2 is a chart showing a configuration example of a hydraulic control circuit of the belt continuously variable transmission.

FIG. 2 is a chart for explaining one example of the hydraulic control circuit 4 in the control valve body 3, the chart showing a part relating to adjustment of the working oil pressure of the transmission mechanism (primary and secondary pulleys) in the hydraulic control circuit 4.

A first pressure adjusting valve 41 adjusts line pressure from the oil pressure generated in the oil pump OP by adjusting a drain amount of the oil OL in the first pressure adjusting valve 41.

The line pressure adjusted by the first pressure adjusting valve 41 is supplied to a primary pressure adjusting valve 43 and a secondary pressure adjusting valve 44, and a second pressure adjusting valve 42. The line pressure is also supplied to other pressure adjusting valves provided in the hydraulic control circuit 4.

The second pressure adjusting valve 42 adjusts pilot pressure from the line pressure.

The pilot pressure adjusted by the second pressure adjusting valve 42 is supplied to a primary solenoid 45 and a secondary solenoid 46.

The primary solenoid 45 and the secondary solenoid 46 are actuated on the basis of commands of the control device (not shown) and adjust signal pressure to be supplied to the primary pressure adjusting valve 43 and the secondary pressure adjusting valve 44.

In the primary pressure adjusting valve 43 and the secondary pressure adjusting valve 44, a spool valve (not shown) moves in the axial direction in accordance with the signal pressure.

When the spool valve moves in the axial direction, the line pressure adjusted by the first pressure adjusting valve 41 is adjusted to be pressure according to a position of the spool valve, and then supplied to a pressure receiving chamber of the corresponding pulley (primary or secondary pulley).

The first pressure adjusting valve 41 described above is positioned on the most upstream side (oil pump OP side) in the hydraulic control circuit 4, and the oil pressure generated in the oil pump OP is first supplied to the first pressure adjusting valve 41.

In the first pressure adjusting valve 41, when the line pressure is adjusted from the oil pressure generated in the oil pump OP, part of the oil generated in the oil pump OP is drained.

The first pressure adjusting valve 41 is provided in the control valve body 3. A discharge hole 41a of the oil OL drained from the first pressure adjusting valve 41 is opened on a lower surface of the control valve body 3 on the oil pan 25 side (see FIG. 1).

As shown in FIG. 1, on the oil pan 25 side (lower side) of the control valve body 3, an oil strainer 5 is attached. The oil strainer 5 has a basic configuration in which a filter 53 is sandwiched between an upper case 51 and a lower case 52.

The upper case 51 and the lower case 52 are respectively manufactured by, for example, injection molding with a heat-resistant resin material.

The filter 53 is made by overlapping and integrating an unwoven cloth filter 531 and a SUS mesh filter 532. The filter 53 is provided so that the unwoven cloth filter 531 is directed to the lower case 52 side, and the SUS mesh filter 532 is directed to the upper case 51 side.

The upper case 51 has a base portion 510 recessed in the direction of separating from the lower case 52, and a flange portion 511 enclosing an outer peripheral edge of the base portion 510 over the entire circumference.

The lower case 52 has a base portion 520 recessed in the direction of separating from the upper case 51, and a flange portion 521 enclosing an outer peripheral edge of the base portion 520 over the entire circumference.

The upper case 51 and the lower case 52 are bonded to each other in a state where the flange portions 511, 521 overlap each other. The filter 53 is sandwiched in a part of the overlapping flange portions 511, 521.

The filter 53 partitions a space S formed between the base portion 510 of the upper case 51 and the base portion 521 of the lower case 52 into two spaces S1, S2 adjacent to each other in the vertical line VL direction.

In the upper case 51 of the oil strainer 5, a cylindrical connection tube 515 is provided at a position immediately below the oil pump OP. The connection tube 515 projects upward on the oil pump OP side from the upper case 51, and is inserted into a suction path (not shown) on the oil pump OP side. When the oil strainer 5 is installed, the connection tube 515 provides communication between the suction path on the oil pump OP side and the space S1 in the oil strainer 5.

Figure 3A:
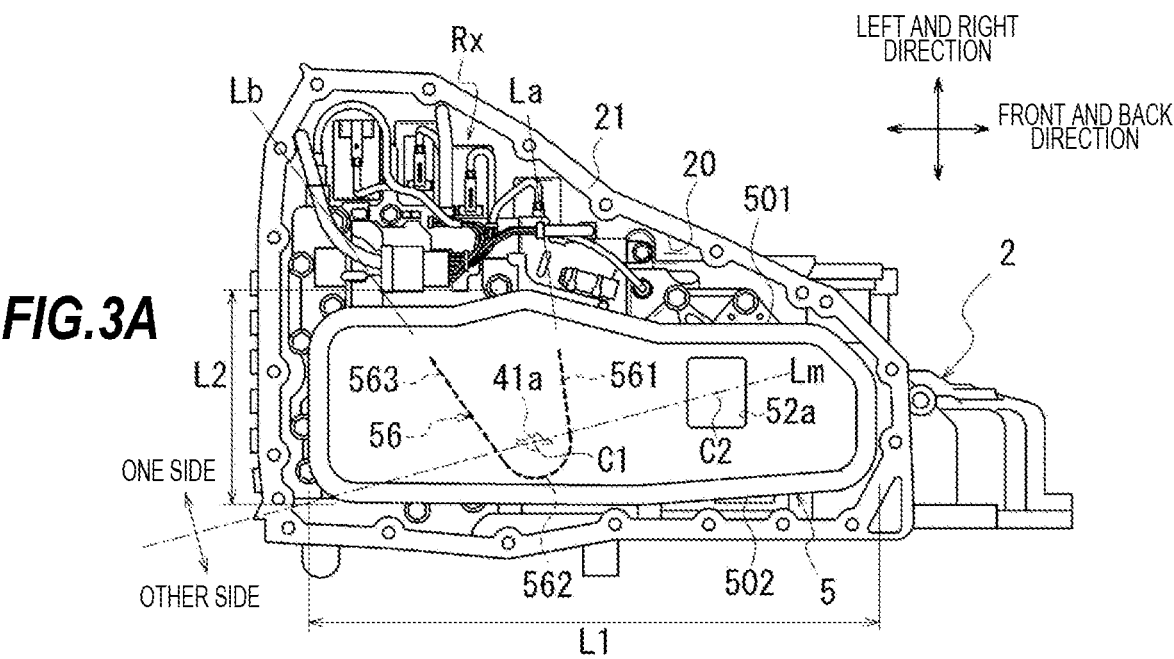
FIGS. 3A-3C are views for explaining arrangement of an oil strainer in an opening of a lower portion of a transmission case.
Figure 3B:
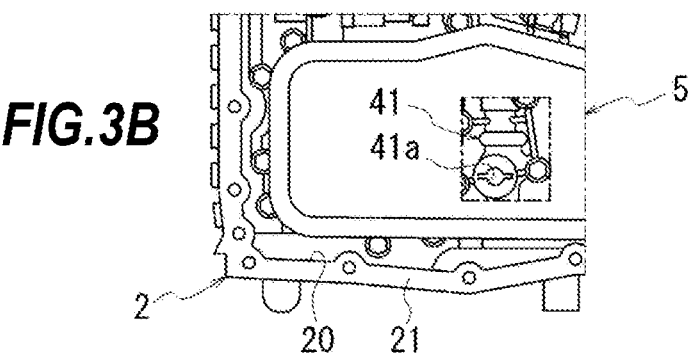
Figure 3C:
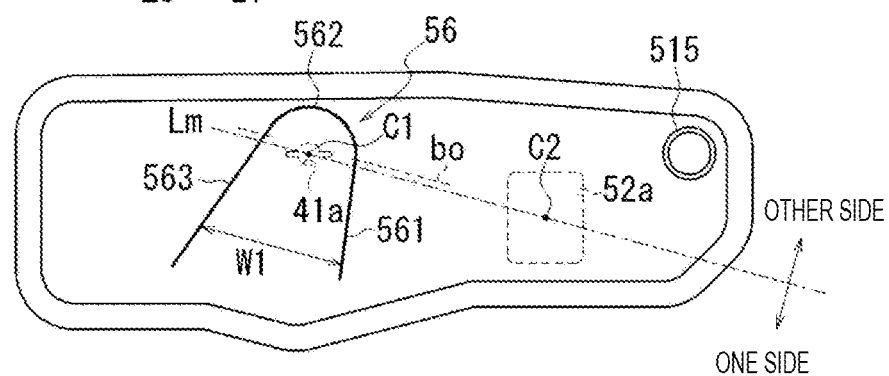

FIGS. 3A-3C are views for explaining arrangement of the oil strainer 5 in the opening 20 of the transmission case 2. FIG. 3A is a view in which the oil strainer 5 installed in the opening 20 is seen from the lower side on the oil pan 25 side. FIG. 3B is a view for explaining a positional relationship between the discharge hole 41a on the control valve body 3 side and the oil strainer 5. FIG. 3C is a plan view in which the oil strainer 5 is seen from the upper side on the transmission case 2 side.

FIG. 3A a rib 56 provided on an upper surface of the oil strainer 5 on the transmission case 2 side (surface on the far side of a paper plane in FIG. 3A is shown by a broken line.

Further, in FIG. 3A, the discharge hole 41a on the transmission case 2 side provided at a position overlapping the oil strainer 5 is shown by an imaginary line.

FIG. 3B, a region of the oil strainer 5 overlapping the discharge hole 41a on the control valve body 3 side is cut out, and the discharge hole 41a placed at a position hidden by the oil strainer 5 is shown.

FIG. 3C, a suction port 52a opened on the oil pan 25 side in the oil strainer 5 (on a surface on the far side of a paper plane in FIG. 3C) is shown by a broken line.

Further, as a matter of convenience, the following description will be given on the premise that a border between a first part 561 and a second part 562 in the rib 56 and a border between a third part 563 and the second part 562 are placed on a broken line bo which is parallel to a straight line Lm shown in FIG. 3C.

As shown in FIG. 3A when seen from the oil pan 25 side, the oil strainer 5 is positioned in the opening 20 of the transmission case 2, formed in a flat, long and thin shape, and provided so that the longitudinal direction is set along the front and back direction of the vehicle in which the continuously variable transmission 1 is mounted.

Length L1 of the oil strainer 5 in the front and back direction of the vehicle is length to cover the opening 20 of the transmission case 2 over the substantially entire length in the front and back direction of the vehicle.

Length L2 of the oil strainer 5 in the left and right direction of the vehicle is length shorter than length of the opening 20 of the transmission case 2 in the left and right direction of the vehicle.

Therefore, in the opening 20, a region Rx not covered by the oil strainer 5 remains on the opposite side of a region where the oil pump OP is installed (on the left side in FIG. 3A in the front and back direction of the vehicle. In particular, this region Rx formed is widely on the side of a side edge portion 501 among two side edge portions 501, 502 of the oil strainer 5 along the front and back direction of the vehicle.

The oil strainer 5 is provided to cover the lower surface of the control valve body 3 on the oil pan 25 side. In the control valve body 3, the discharge hole 41a described above is opened in a region overlapping the oil strainer 5 when seen from the oil pan 25 side.

As shown in FIG. 1, in the lower case 52 of the oil strainer 5, the suction port 52a of the oil OL is provided at a position close to the oil pump OP in the front and back direction of the vehicle.

The suction port 52a is provided in an expanded portion 520a expanded to the oil pan 25 side in the lower case 52.

As shown in FIG. 3A, the suction port 52a is formed in a substantially rectangular shape when seen from the oil pan 25 side.

When seen from the oil pan 25 side, the suction port 52a and the discharge hole 41a on the control valve body 3 side are provided so that positions are not matched from each other in the front and back direction of the vehicle. The suction port 52a of the oil strainer 5 is provided in a region on the vehicle back side in the oil strainer 5, and positioned on the vehicle back side with respect to the discharge hole 41a on the control valve body 3 side.

When seen from the oil pan 25 side, the suction port 52a is provided at a position close to the side edge portion 501 in the oil strainer 5.

Figure 4A:
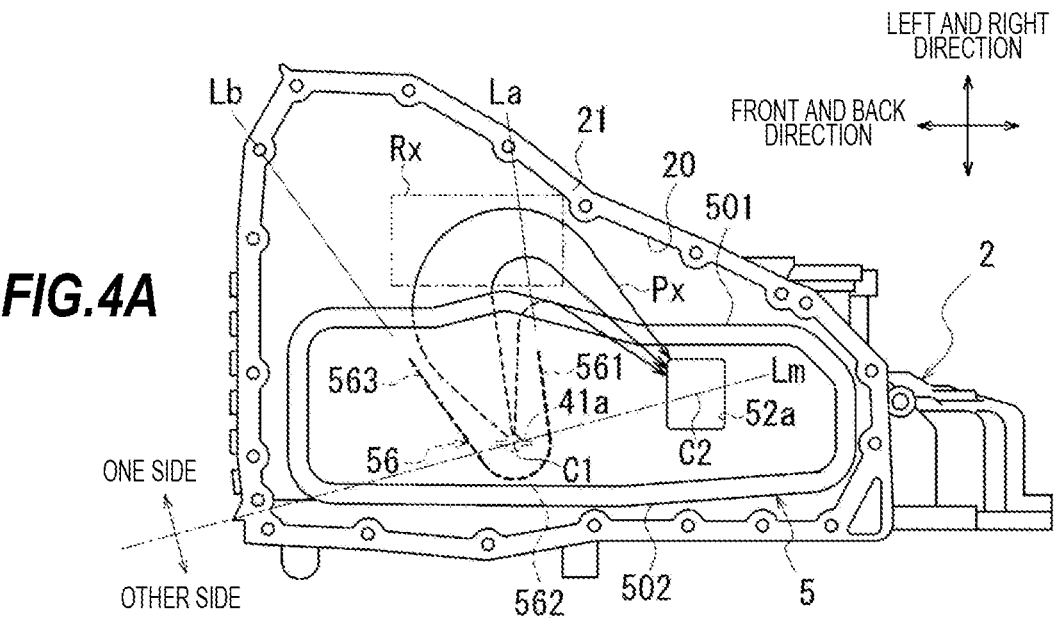
FIGS. 4A and 4B are views for explaining moving routes of oil discharged from a discharge hole.
Figure 4B:
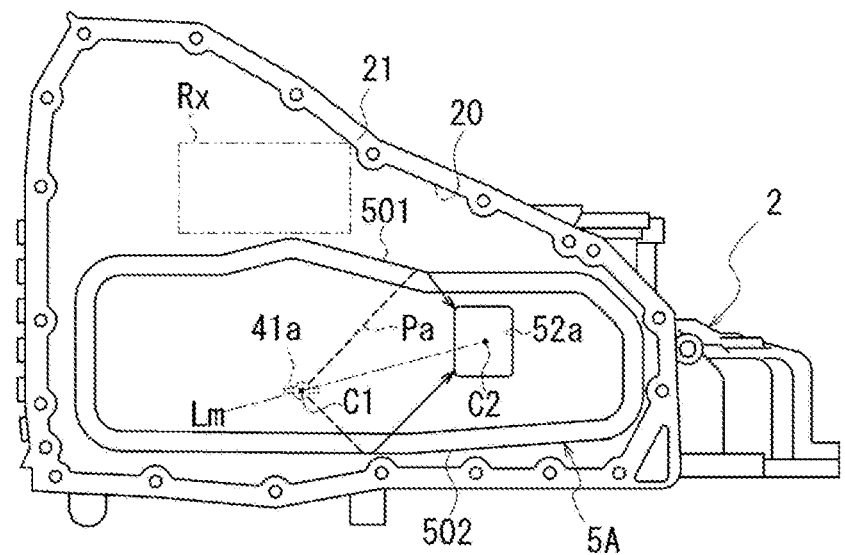

FIGS. 4A and 4B are views for explaining moving routes of the oil OL discharged from the discharge hole 41a. FIG. 4A is a view for explaining a moving route Px of the oil OL in the oil strainer 5 provided with the rib 56. FIG. 4B is a view for explaining a moving route Pa of oil OL in an oil strainer 5A according to a conventional example in which the rib 56 is not provided.

As shown in FIG. 4B, when seen from the oil pan 25 side, a suction port 52a of the oil strainer 5A is positioned on the vehicle back side with respect to the discharge hole 41a on the control valve body 3 side as well as the oil strainer 5. The suction port 52a is provided at a position close to a side edge portion 501 in the oil strainer 5A.

The oil OL discharged from the discharge hole 41a moves along an upper surface of the oil strainer 5A (surface on the control valve body 3 side).

When an oil pump OP is driven, the oil OL in the oil pan 25 is suctioned from the suction port 52a. In an opening 20 of a lower portion of a transmission case 2, a flow of the oil OL running from the discharge hole 41a toward the suction port 52a is created.

In such a case, the oil OL discharged from the discharge hole 41a moves on the upper surface of the oil strainer 5A toward the side edge portions 501, 502 of the oil strainer 5A, and then drops down to the lower side on the oil pan 25 side. The oil OL dropping down in the oil pan 25 moves toward the suction port 52a of the oil OL.

The moving route Pa of the oil OL at this time is shown in FIG. 4B.

A part of the moving route Pa shown by broken lines is a moving route of the oil OL on the upper surface of the oil strainer 5A on the control valve body 3 side. A part shown by solid lines is a moving route of the oil OL after dropping down on the oil pan 25 side from the side edge portions 501, 502 of the oil strainer 5A.

As clear from FIG. 4B, almost all the oil OL discharged from the discharge hole 41a moves on the moving route Pa with which the oil can reach the suction port 52a by the shortest moving distance.

Therefore, a flow of the oil OL moving from the upper surface on the control valve body 3 side toward a lower surface on the oil pan 25 side is mainly created in or near the side edge portions 501, 502 of the oil strainer 5A.

Therefore, in a region Rx not covered by the oil strainer 5A in the opening 20, almost no flow of the oil OL is created. Thus, in this region Rx, oil OL to be not suctioned to the oil pump OP side is accumulated.

Meanwhile, the oil strainer 5 according to the present embodiment is provided with the rib 56 on the upper surface opposing the control valve body 3.

The rib 56 is provided to regulate the moving direction of the oil OL discharged from the discharge hole 41a to a part between the oil strainer 5 and the control valve body 3.

As shown in FIG. 3C the rib 56 formed in a substantially U shape is provided on a surface of the oil strainer 5. The rib 56 is integrated with the upper case 51 of the oil strainer 5 (see FIG. 1). The rib 56 projects upward on the control valve body 3 side from an upper surface of the upper case 51, and is formed with such height that contact with the control valve body 3 is avoided.

As shown in FIG. 3C when seen from the upper side of the transmission case 2 side, the rib 56 is provided to cross the straight line Lm passing through center C1 of the discharge hole 41a and center C2 of the suction port 52a from the other side (side edge portion 502 side) to one side (side edge portion 501 side).

The rib 56 is a linear projection in which the first part 561, the second part 562, and the third part 563 continue in series.

The first part 561 is provided to cross the straight line Lm from one side (side edge portion 501 side) to the other side (side edge portion 502 side) in a region between the discharge hole 41a and the suction port 52a in the upper case 51.

The third part 563 provided to cross the straight line Lm from the one side (side edge portion 501 side) to the other side (side edge portion 502 side) in a region on the opposite side of the suction port 52a with respect to the discharge hole 41a.

Regarding the first part 561 and the third part 563, length on the one side (side edge portion 501 side) with respect to the straight line Lm is longer than length on the other side (side edge portion 502 side).

The second part 562 is positioned on the other side (side edge portion 502 side) of the straight line Lm, and formed in a semi-circular shape when seen from the transmission case 2 side.

One end of the second part 562 is connected to one end of the first part 561 on the broken line bo which is parallel to the straight line Lm.

The other end of the second part 562 is connected to one end of the third part 563 on the broken line bo which is parallel to the straight line Lm.

The border between the first part 561 and the second part 562 in the rib 56 and the border between the third part 563 and the second part 562 in the rib 56 are positioned on the broken line bo which is parallel to the straight line Lm shown in FIG. 3C.

The first part 561 and the third part 563 cross the straight line Lm so that a separation distance W1 in the straight line Lm direction is increased as the parts separate from the second part 562.

As shown in FIG. 3A, the region Rx not covered by the oil strainer 5 in the opening 20 is positioned on an extension line La of the first part 561. The region Rx not covered by the oil strainer 5 in the opening 20 is also positioned on an extension line Lb of the third part 563.

When seen from the oil pan 25 side, the region Rx not covered by the oil strainer 5 in the opening 20 is positioned between the extension line La on the first part 561 side and the extension line Lb on the third part 563 side.

Actions of the oil strainer 5 having the rib 56 will be described.

In the vehicle in which the continuously variable transmission 1 is mounted, when the oil pump OP is driven by start-up of a driving source, etc., the oil OL in the oil pan 25 is suctioned to the oil pump OP via the oil strainer 5. The oil pump OP pressurizes the suctioned oil and supplies to the hydraulic control circuit 4 in the control valve body 3.

Thereby, the oil pressure generated in the oil pump OP is firstly supplied to the first pressure adjusting valve 41 of the hydraulic control circuit 4. The first pressure adjusting valve 41 adjusts the line pressure from the oil pressure generated in the oil pump OP. At this time, part of the oil generated in the oil pump OP is drained.

The discharge hole 41a of the oil drained from the first pressure adjusting valve 41 is opened on the lower surface of the control valve body 3 on the oil pan 25 side (see FIG. 1). The drained oil OL is discharged from this discharge hole 41a.

As shown in FIG. 1, the oil strainer 5 is positioned immediately below the discharge hole 41a in the vertical line VL direction.

The oil strainer 5 is provided to cover the lower surface of the control valve body 3 on the oil pan 25 side. In the control valve body 3, the discharge hole 41a described above is opened in the region overlapping the oil strainer 5 when seen from the oil pan 25 side.

As shown in FIG. 4A, when seen from the oil pan 25 side, the suction port 52a of the oil strainer 5 is positioned on the vehicle back side of the discharge hole 41a on the control valve body 3 side. The suction port 52a is provided at a position close to the side edge portion 501 on one side with respect to the straight line Lm in the oil strainer 5.

Further, the substantially-U-shaped rib 56 is provided to enclose a position immediately below the discharge hole 41a.

As shown in FIG. 4A, the oil OL discharged from the discharge hole 41a moves along the upper surface of the oil strainer 5 (surface on the control valve body 3 side).

When the oil pump OP is driven, the oil OL in the oil pan 25 is suctioned from the suction port 52a. In the opening 20 of the lower portion of the transmission case 2, a flow of the oil OL running from the discharge hole 41a toward the suction port 52a is created.

In such a case, the oil OL discharged from the discharge hole 41a moves on the upper surface of the oil strainer 5 toward the side edge portion 501 of the oil strainer 5 while being guided by the rib 56, and then drops down to the lower side on the oil pan 25 side. The oil OL dropping down in the oil pan 25 moves toward the suction port 52a of the oil OL.

The moving route Px of the oil OL at this time is shown in FIG. 4A.

A part of the moving route Px shown by broken lines is a moving route of the oil OL on the upper surface of the oil strainer 5 on the control valve body 3 side. A part shown by solid lines is a moving route of the oil OL after dropping down on the oil pan 25 side from the side edge portion 501 of the oil strainer 5.

As shown in FIG. 4A, the substantially-U-shaped rib 56 is provided on the upper surface of the oil strainer 5 (surface on the control valve body 3 side).

The first part 561 of the rib 56 is provided at a position to cross the moving route Pa of the oil OL in a case where the rib 56 is not provided (moving route of moving from the discharge hole 41a to the suction port 52a side by the shortest distance), and inhibits movement of the oil OL by the shortest distance.

The second part 562 of the rib 56 is positioned on the other side with respect to the straight line Lm (side edge portion 502 side), and formed in a semi-circular shape surrounding the discharge hole 41a at a predetermined interval. Therefore, movement of the oil OL discharged from the discharge hole 41a to the other side of the straight line Lm (side edge portion 502 side) is restricted, and the oil OL moving to the one side (side edge portion 501 side) is more than the oil OL moving to the other side (side edge portion 502 side).

Further, the third part 563 of the rib 56 is provided so that the separation distance W1 from the first part 561 is increased as the third part 563 separates from the second part 562 to the one side (side edge portion 501 side). When seen from the oil pan 25 side, the region Rx not covered by the oil strainer 5 in the opening 20 is positioned between the extension line La of the first part 561 and the extension line Lb of the third part 563.

Therefore, the oil OL discharged from the discharge hole 41*a* is bypassed to the region Rx not covered by the oil strainer 5 in the opening 20 and is returned to the lower side on the oil pan 25 side from the side edge portion 501 side of the one side of the oil strainer 5.

Thereby, a moving distance (journey) by which the oil OL running from the discharge hole 41*a* toward the suction port 52*a* of the oil reaches the suction port 52*a* is extended.

The oil OL flowing along the moving route Px of the oil pulls the oil OL near the moving route to the moving route. Thus, the oil OL near the moving route is taken into a flow of the oil running from the discharge hole 41*a* toward the suction port 52*a*.

Therefore, by an amount of extension of the moving distance (journey), an amount of the oil OL to be taken in is increased. Thus, it is possible to supply more oil OL to the suction port 52*a*.

Thereby, return of the discharged oil OL to the suction port 52*a* is improved. Thus, suction of the air is less likely to occur.

In a case where the rib 56 is not provided, almost all the oil OL discharged from the discharge hole 41*a* moves on the moving route Pa with which the oil can reach the suction port 52*a* by the shortest moving distance (see FIG. 4B).

Therefore, a flow of the oil OL moving from the upper side on the control valve body 3 side to the lower side on the oil pan 25 side is mainly created in or near the side edge portion 501 of the oil strainer 5A.

In such a case, in the region Rx not covered by the oil strainer 5A in the opening 20, almost no flow of the oil OL is created. Thus, the oil OL accumulated in this region Rx is not guided to the suction port 52*a* of the oil OL unlike the case where the rib 56 is provided.

Therefore, when viscosity of the oil OL is high and fluidity is low, the return of the discharged oil OL to the suction port 52*a* is deteriorated.

In such a state, when height of the oil OL stored in the oil pan 25 is lowered and the suction port 52*a* is exposed to the atmosphere, a state becomes a suction-of-air state in which the air is suctioned to the oil pump OP side. In the suction-of-air state, working pressure supplied to the transmission mechanism is not stabilized.

The present embodiment shows, as an example, the case where the rib 56 is arranged to enclose the position immediately below the discharge hole 41*a* (drain hole) of the first pressure adjusting valve 41 to which the oil pressure generated in the oil pump OP is firstly supplied.

This is because an amount of the oil OL discharged from the discharge hole 41*a* is the largest in the pressure adjusting valve to which the oil pressure generated in the oil pump OP is firstly supplied (first pressure adjusting valve 41).

An installment place of the rib 56 in the oil strainer 5 is not limited only to the place shown in the above embodiment. The rib 56 may be provided to enclose a position immediately below a discharge hole of another pressure adjusting valve.

The number of the rib 56 is also not limited to one. The oil strainer may have a configuration in which plural ribs 56 are provided.

The oil strainer 5 according to the present embodiment has the following configuration.
(1) The oil strainer 5 is arranged between the oil pan 25 configured to close the opening 20 of the lower portion of the transmission case 2 (lower opening) and the control valve body 3 which is installed in the opening 20 of the lower portion.

The control valve body 3 has the discharge hole 41*a* of the oil OL on the lower surface of a portion opposing the oil strainer 5.

The oil strainer 5 has the suction port 52*a* of the oil (oil suction port) on the lower surface of a portion opposing the oil pan 25.

The oil strainer 5 has the rib 56 projecting on the control valve body 3 side on a surface of a portion opposing the control valve body 3.

When seen from the oil pan 25 side, the suction port 52*a* and the discharge hole 41*a* are provided so that the positions are not matched from each other.

When seen from the oil pan 25 side, the rib 56 has the first part 561 provided to cross the straight line Lm passing through the suction port 52*a* and the discharge hole 41*a* in the region between the suction port 52*a* and the discharge hole 41*a*.

With this configuration, it is possible to prevent the oil OL discharged from the discharge hole 41*a* to the suction port 52*a* from reaching the suction port 52*a* on the shortest route.

Thereby, the moving distance (journey) with which the oil OL running from the discharge hole 41*a* toward the oil suction port 52*a* reaches the suction port 52*a* is extended.

The oil OL flowing along the moving route Px of the oil pulls the oil OL near the moving route. Thus, the oil OL near the moving route Px is taken into the flow of the oil running from the discharge hole 41*a* toward the suction port 52*a*.

Therefore, by the amount of the extension of the moving distance (journey), the amount of the oil OL to be taken in is increased. Thus, it is possible to supply more oil OL to the suction port 52*a*.

In a case where the viscosity of the oil OL discharged from the discharge hole 41*a* of the control valve body 3 is low, the oil OL having low viscosity is spread around the oil strainer 5 by the rib 56.

The oil OL having low viscosity spread around the oil strainer 5 is mixed up with surrounding oil having relatively high viscosity for a longer time. The longer the oil is mixed up, the lower the viscosity of the surrounding oil OL having relatively high viscosity becomes. Thus, the return of the oil OL to the suction port 52*a* becomes smoother than the case where the rib 56 is not provided.

The oil strainer 5 according to the present embodiment has the following configuration.
(2) On the one side (side edge portion 501 side) of the straight line Lm when seen from the oil pan 25 side, there is the region Rx not covered by the oil strainer 5 in the opening 20 of the transmission case 2 when seen from the oil pan 25 side.

On the one side (side edge portion 501 side) of the straight line Lm when seen from the oil pan 25 side, the region Rx not covered by the oil strainer 5 is positioned on the extension line La of the first part 561 of the rib 56.

In the opening 20 of the lower portion of the transmission case 2, there is a tendency that the oil OL is accumulated in the region Rx not covered by the oil strainer 5 when seen from the oil pan 25 side.

With the above configuration, the oil OL running from the discharge hole 41*a* toward the suction port 52*a* is bypassed to the region Rx not covered by the oil strainer 5 and finally reaches the suction port 52*a*.

At this time, the oil accumulated in the region Rx not covered by the oil strainer 5 in the opening 20 is taken into the oil OL flowing along the moving route Px. Thus, it is possible to supply more oil to the suction port 52*a*.

That is, by providing the first part 561 of the rib 56, the moving route (journey) of the oil OL running from the discharge hole 41a toward the suction port 52a is extended, and it is possible to create a flow of the oil OL even in the region Rx where no flow of the oil OL is created.

Thereby, the oil OL of the region Rx where no flow of the oil OL is created is taken into the flow of the oil OL running from the discharge hole 41a toward the suction port 52a via the region Rx. Thus, the amount of the oil OL reaching the suction port 52a is increased.

The oil strainer 5 according to the present embodiment has the following configuration.

(3) The rib 56 has the second part 562 positioned on the other side (side edge portion 502 side) of the straight line Lm when seen from the oil pan 25 side.

When seen from the oil pan 25 side, the second part 562 is provided in a range from the suction port 52a side to the opposite side of the discharge hole 41a, in the longitudinal direction of the straight line Lm, so as to cross between the discharge hole 41a and the side edge portion 502 of the oil strainer 5.

With this configuration, the movement of the oil OL discharged from the discharge hole 41a to the side edge portion 502 side positioned on the other side (side edge portion 502 side) of the straight line Lm is restricted by the second part 562.

On the side edge portion 501 side positioned on the one side with respect to the straight line Lm, the region Rx not covered by the oil strainer 5 among the opening 20 of the transmission case 2 is positioned, and the oil OL is accumulated in this region Rx.

Therefore, by providing the second part 562, it is possible to guide much of the oil OL discharged from the discharge hole 41a toward the region Rx. Thereby, much of the oil OL reaches the suction port 52a side through the region Rx. Therefore, the oil OL accumulated in the region Rx is taken into the oil OL flowing from the discharge hole 41a toward the suction port 52a and reaches the suction port 52a. Thereby, it is possible to supply more oil to the suction port 52a.

The oil strainer 5 according to the present embodiment has the following configuration.

(4) The rib 56 has the third part 563 provided to cross the straight line Lm on the opposite side of the suction port 52a with respect to the discharge hole 41a.

When seen from the oil pan 25 side, the rib 56 is formed in a U shape in which the linear first part 561, the arc-shaped second part 562, and the linear third part 563 continue in series.

In the U-shaped rib 56, an opening between the first part 561 and the third part 563 is directed to the region Rx not covered by the oil strainer 5 in the opening 20 of the transmission case 2.

With this configuration, it is possible to guide the oil OL discharged from the discharge hole 41a to the region Rx where the oil OL is accumulated (one side (side edge portion 501 side) of the straight line Lm).

Since the oil OL accumulated in the region Rx can be taken into the oil OL flowing from the discharge hole 41a toward the suction port 52a, it is possible to supply more oil to the suction port 52a.

As described above, the rib 56 is formed with such height that the contact with the control valve body 3 is avoided. Therefore, by providing the U-shaped rib 56, much of the oil OL discharged from the discharge hole 41a is guided to the region Rx side. Meanwhile, part of the oil OL discharged from the discharge hole 41a goes over the rib 56, is bypassed to the side edge portion 502 on the opposite side of the region Rx of the oil strainer 5, and reaches the suction port 52a.

Therefore, the second part 562 of the U-shaped rib 56 exerts a function of reducing the movement of the oil OL discharged from the discharge hole 41a to the side edge portion 502 side.

The oil strainer 5 according to the present embodiment has the following configuration.

(5) When seen from the oil pan 25 side, the first part 561 and the third part 563 are provided so that the separation distance W1 each other is increased as a distance from the second part 562 is increased.

With this configuration, the oil OL to be guided to the region Rx side among the oil OL discharged from the discharge hole 41a passes through the region Rx while spreading. Thereby, it is possible to take more oil OL accumulated in the region Rx in and guide to the suction port 52a.

The oil strainer 5 according to the present embodiment has the following configuration.

(6) The rib 56 is made of the same material as a constituent material of the oil strainer 5 and integrated with the oil strainer 5.

With this configuration, when the oil strainer 5 is manufactured, it is possible to manufacture the rib 56 together.

When the rib 56 is provided as a separate body from the oil strainer 5, a manufacturing step for the rib 56 and a step of installing the rib 56 in the oil strainer 5 are required, and the number of steps relating to manufacture is increased more than the case where the rib 56 is integrated. As a result, manufacturing cost is increased.

By integrating the rib 56, it is possible to suppress an increase in the manufacturing cost.

(7) The space S in the oil strainer 5 is partitioned into the two spaces S1, S2 adjacent to each other in the thickness direction by the filter 53 (filter member) having the unwoven cloth filter 531 which is arranged to cross the thickness direction.

The thickness direction is the direction along the vertical line VL with the installed state of the continuously variable transmission (automatic transmission) provided with the oil strainer 5 in the vehicle as a reference.

With this configuration, it is possible to extend an area of the filter 53 and increase the total amount of the oil OL suctioned to the oil pump OP side.

In a case where an electric oil pump EOP is provided in addition to the oil pump OP, the oil pump OP and the electric oil pump EOP can share the single oil strainer 5.

It is possible to reduce a space required for installment more than a case where one oil strainer 5 is provided for each of the oil pump OP and the electric oil pump EOP, and also to reduce cost.

(8) The plural pressure adjusting valves of the oil OL are provided in the control valve body 3.

The discharge hole 41a is a discharge hole of the first pressure adjusting valve 41 (pressure adjusting valve) which is the first valve to adjust the pressure of the oil OL suctioned via the oil strainer 5.

The amount of the discharged oil OL is the largest in the discharge hole 41a of the first pressure adjusting valve 41 which is the first valve to adjust the pressure of the suctioned oil OL. Thus, it is possible to guide more oil OL to the suction port 52a.

The oil OL distributed in the control valve body 3, the oil whose pressure is adjusted is swiftly discharged from the discharge hole 41a. The discharged oil OL collides with the portion (upper surface) of the oil strainer 5 opposing the control valve body 3 and then is guided to the region Rx in the opening 20 by the rib 56.

Therefore, the guided oil OL takes the oil OL accumulated in the region Rx in and returns to the suction port 52a. Thus, oil shortage in the oil pan 25 is less likely to occur. In addition, this effect is also exerted not only at the time of a low temperature but also at the time of a high temperature, and a returning property of the oil OL to the oil pan 25 side is improved.

Figure 5A:
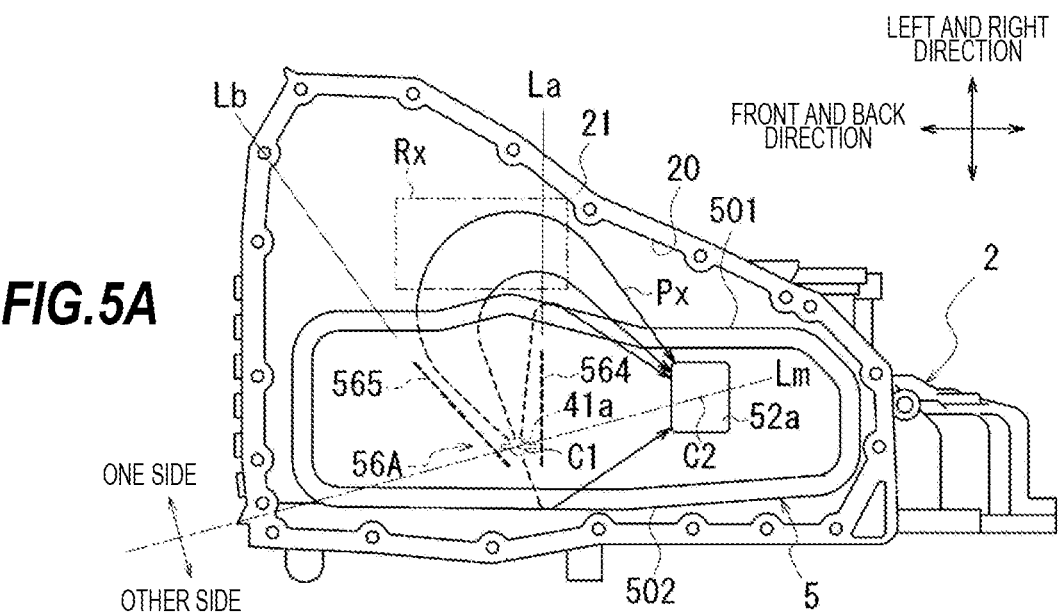
FIGS. 5A and 5B are views for explaining a rib according to a modified example.
Figure 5B:
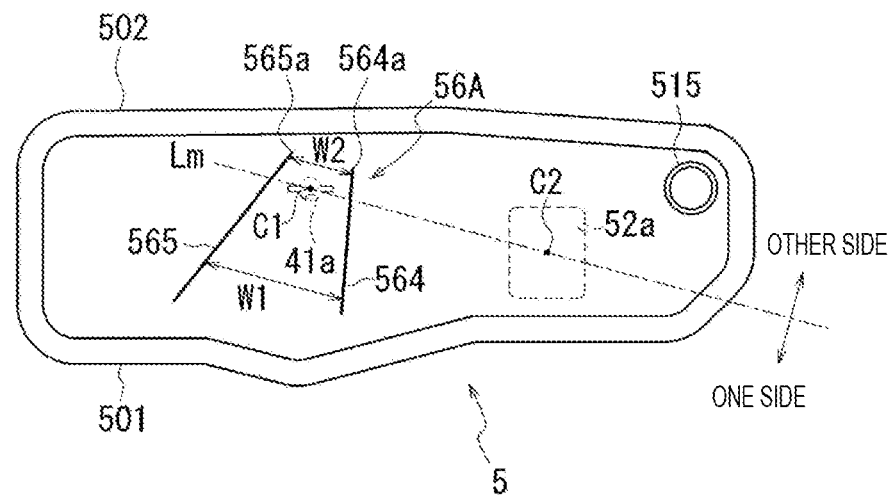

FIGS. 5A and 5B are views for explaining a rib 56A according to a modified example.

FIG. 5A is a view for explaining a moving route of the oil OL discharged from the discharge hole 41a, the view in which the portions around the oil strainer 5 are seen from the lower side on the oil pan 25 side.

FIG. 5B is a view for explaining arrangement of the rib 56A, the view in which the oil strainer 5 is seen from the upper side on the control valve body 3 side.

In FIG. 5A, the rib 56A provided on the upper surface of the oil strainer 5 on the control valve body 3 side (surface on the far side of a paper plane in FIG. 5A is shown by an imaginary line. Further, in FIG. 5A the discharge hole 41a on the transmission case 2 side provided at the position overlapping the oil strainer 5 is shown by an imaginary line. In FIG. 5B the suction port 52a opened on the oil pan 25 side in the oil strainer 5 (surface on the far side of a paper plane in FIG. 5B) is shown by an imaginary line.

The above embodiment shows, as an example, the case where the rib 56 is formed in a substantially U shape so that the first part 561, the second part 562, and the third part 563 are connected in series to enclose the position immediately below the discharge hole 41a.

The shape of the rib is not limited to this shape but the rib 56A of the shape shown in FIGS. 5A and 5B is acceptable.

The rib 56A does not have a part corresponding to the second part 562 of the rib 56 described above but is formed by a pair of linear projection 564 (first part) and projection 565 (third part). These projections 564, 565 project upward on the control valve body 3 side, and are formed with such height that contact with the control valve body 3 is avoided.

The projection 564 is provided in a region between the discharge hole 41a and the suction port 52a in the upper case 51. The projection 564 is provided to cross the straight line Lm passing through the center C1 of the discharge hole 41a and the center C2 of the suction port 52a from the other side (side edge portion 502 side) to the one side (side edge portion 501 side).

The projection 565 is provided to cross the straight line Lm from the other side (side edge portion 502 side) to the one side (side edge portion 501 side) in a region on the opposite side of the suction port 52a with respect to the discharge hole 41a.

Regarding the projection 564 and the projection 565, length on the one side (side edge portion 501 side) with respect to the straight line Lm is longer than length on the other side (side edge portion 502 side).

The projection 564 and the projection 565 cross the straight line Lm so that a separation distance W1 in the straight line Lm direction is increased as the projections separate from the straight line Lm to the one side (side edge portion 501 side).

A separation distance W2 between an end portion 564a of the projection 564 on the other side (side edge portion 502 side) and an end portion 565a of the projection 565 on the other side (side edge portion 502 side) is minimum.

As shown in FIG. 5A, the region Rx not covered by the oil strainer 5 in the opening 20 is positioned on extension lines La, Lb of the projections 564, 565.

When seen from the oil pan 25 side, the region Rx not covered by the oil strainer 5 in the opening 20 is positioned between the extension line La on the projection 564 side and the extension line Lb on the projection 565 side.

Actions of the rib 56A will be described.

As shown in FIG. 5A in the control valve body 3, the discharge hole 41a described above is opened in a region overlapping the oil strainer 5 when seen from the oil pan 25 side.

When seen from the oil pan 25 side, in the oil strainer 5, the pair of projections 564, 565 forming the rib 56A is provided while sandwiching the position immediately below the discharge hole 41a. When seen from the oil pan 25 side, the discharge hole 41a is positioned between the pair of projections 564, 565.

Therefore, the oil OL discharged from the discharge hole 41a is discharged to a region between the pair of projections 564, 565. Regarding the pair of projections 564, 565, the separation distance W1 in the straight line Lm direction is increased as the projections go from the straight line Lm toward the region Rx side.

Therefore, much of the oil OL discharged to the part between the pair of projections 564, 565 flows to the one side (side edge portion 501 side) where the region Rx is positioned with respect to the straight line Lm.

Thereby, much of the oil OL discharged from the discharge hole 41a is bypassed to the region Rx not covered by the oil strainer 5 in the opening 20 and is returned to the lower side on the oil pan 25 side from the side edge portion 501 side of the one side of the oil strainer 5.

Then, a flow of the oil OL running from the discharge hole 41a toward the suction port 52a of the oil while being bypassed to the region Rx (moving route Px) is formed, and a moving distance (journey) by which the oil OL discharged from the discharge hole 41a reaches the suction port 52a is extended.

The oil OL flowing along the moving route Px of the oil pulls the oil OL near the moving route Rx to the moving route. Thus, the oil OL near the moving route is taken into a flow of the oil running from the discharge hole 41a toward the suction port 52a.

Therefore, by an amount of extension of the moving distance (journey), an amount of the oil OL to be taken in is increased. Thus, it is possible to supply more oil OL to the suction port 52a.

Thereby, return of the discharged oil OL to the suction port 52a is improved. Thus, suction of the air is less likely to occur.

Part of the oil OL discharged from the discharge hole 41a is returned to the lower side on the oil pan 25 side from the side edge portion 502 side of the other side of the oil strainer 5.

Therefore, even in a case where the rib 56A is provided to actively form a flow of the oil on the side edge portion 501 side, it is possible to reliably form a flow of the oil running toward the suction port 52a even on the side edge portion 502 side of the oil strainer 5.

Thus, without accumulating the oil OL around the oil strainer 5, it is possible to guide the oil to the suction port 52a side. Therefore, it is possible to ensure an amount of the oil OL reaching the suction port 52a.

In such a way, the oil strainer 5 having the rib 56A according to the modified example has the following configuration.

(9) When seen from the oil pan 25 side, the rib 56A has the projection 564 (first part) provided to cross the straight line Lm passing through the suction port 52a and the discharge hole 41a in the region between the suction port 52a and the discharge hole 41a, and the projection 565 (second part) provided to cross the straight line Lm on the opposite side of the suction port 52a with respect to the discharge hole 41a.

When seen from the oil pan 25 side, the projection 564 and the projection 565 are provided to have a gap in the longitudinal direction of the straight line Lm and the separation distance W1 in the straight line Lm direction is increased as the projections separate from the straight line Lm to the one side (side edge portion 501 side) and go close to the region Rx.

With this configuration, much of the oil OL discharged from the discharge hole 41a is returned to the lower side on the oil pan 25 side from the side edge portion 501 side of the oil strainer 5, while part of the oil OL is returned to the lower side on the oil pan 25 side from the side edge portion 502 side of the oil strainer 5.

The region Rx where the oil OL is accumulated is positioned on the side edge portion 501 side. Much of the oil OL discharged from the discharge hole 41a is bypassed to the region Rx and reaches the suction port 52a. Thereby, the oil OL moving toward the suction port 52a reaches the suction port 52a while taking the oil OL accumulated in the region Rx in. Thus, it is possible to ensure the amount of the oil OL reaching the suction port 52a.

It is possible to form a flow of the oil OL running toward the suction port 52a even on the side edge portion 502 side of the oil strainer 5. Thereby, without accumulating the oil OL around the oil strainer 5, it is possible to guide more oil to the suction port 52a side. Thus, it is possible to ensure the amount of the oil OL reaching the suction port 52a.

In a case where the viscosity of the oil OL discharged from the discharge hole 41a is low, the flow of the oil OL is spread by the rib 65A.

Then, while ensuring an opportunity that the oil OL having low viscosity is mixed up with the oil OL having relatively high viscosity around the oil strainer 5, it is possible to extend a time for the mix-up.

When the time for the mix-up can be extended, the viscosity of the oil OL having relatively high viscosity is lowered. Thus, the return of the oil OL to the suction port 52a is improved.

The embodiment according to the present invention is described above. The present invention is not limited to the modes described above but can be appropriately changed within the range of the technical thought of the invention.

The present application claims a priority of Japanese Patent Application No. 2018-140839 filed with the Japan Patent Office on Jul. 27, 2018, all the contents of which are hereby incorporated by reference.

The invention claimed is:

1. An oil strainer arranged between an oil pan configured to close a lower opening of a transmission case and a control valve body which is installed in the lower opening, wherein
    the control valve body has a discharge hole of oil in a portion opposing the oil strainer,
    the oil strainer has an oil suction port in a portion opposing the oil pan, and has a rib projecting on the control valve body side on a surface of a portion opposing the control valve body,
    when seen from the oil pan side, the oil suction port and the discharge hole are provided so that positions are not matched from each other,
    when seen from the oil pan side, the rib is provided to cross a straight line passing through the oil suction port and the discharge hole in a region between the oil suction port and the discharge hole,
    on one side of the straight line when seen from the oil pan side, there is a region not covered by the oil strainer in the lower opening when seen from the oil pan side, and
    on the one side of the straight line when seen from the oil pan side, the region not covered by the oil strainer is positioned on an extension line of a first part of the rib.

2. The oil strainer according to claim 1, wherein
    the rib has a second part positioned on the other side of the straight line when seen from the oil pan side, and
    when seen from the oil pan side, the second part is provided in a range from the oil suction port side to the opposite side of the discharge hole, in the longitudinal direction of the straight line Lm, so as to cross between the discharge hole and an outer peripheral portion of the oil strainer.

3. The oil strainer according to claim 2, wherein
    the rib has a third part provided to cross the straight line on the opposite side of the oil suction port with respect to the discharge hole, and
    when seen from the oil pan side, the rib is formed in a U shape by the first part, the second part, and the third part.

4. The oil strainer according to claim 3, wherein
    when seen from the oil pan side, the first part and the third part are provided so that a separation distance each other is increased as a distance from the second part is increased.

5. The oil strainer according to claim 1, wherein
    the rib has a third part provided to cross the straight line on the opposite side of the oil suction port with respect to the discharge hole, and
    when seen from the oil pan side, the first part and the third part are provided to have a gap in the direction along the straight line and provided so that a separation distance each other is increased as a distance from the straight line to the one side is increased.

6. The oil strainer according to claim 1, wherein
    the rib is made of the same material as a constituent material of the oil strainer and integrated with the oil strainer.

* * * * *